(12) United States Patent
Labaugh

(10) Patent No.: US 6,429,446 B1
(45) Date of Patent: Aug. 6, 2002

(54) MULTIPLE INFRARED MISSILE JAMMER

(75) Inventor: Kenneth D. Labaugh, Wilton, NH (US)

(73) Assignee: BAE Systems Information and Electronic Systems Integration, Inc., Nashua, NH (US)

( * ) Notice: Subject to any disclaimer, the term of this patent is extended or adjusted under 35 U.S.C. 154(b) by 0 days.

(21) Appl. No.: 05/574,170

(22) Filed: Apr. 28, 1975

(51) Int. Cl.⁷ .............................. G01J 1/00; H04K 3/00; G02B 26/02; B64D 47/06

(52) U.S. Cl. ................. 250/504 R; 244/3.16; 359/233; 359/298; 359/111; 359/235; 359/236; 340/981

(58) Field of Search ................. 250/233, 236, 250/239, 344, 495, 495.1, 504 R; 356/78, 188; 350/272, 274, 316; 359/235, 236; 244/3.16, 3.13

(56) References Cited

U.S. PATENT DOCUMENTS

| | | | | |
|---|---|---|---|---|
| 3,023,661 A | * | 3/1962 | McClusky et al. | 356/188 |
| 3,219,827 A | * | 11/1965 | Pittinger | 250/504 |
| 3,771,731 A | * | 11/1973 | Dyner | 250/495 |
| 3,797,395 A | * | 3/1974 | Tyroler | 250/495 |

* cited by examiner

*Primary Examiner*—Stephen C. Buczinski
(74) *Attorney, Agent, or Firm*—Daniel J. Long

(57) ABSTRACT

Apparatus for providing simultaneous jamming of a number of missiles is disclosed comprising a plurality of reticles each having a pattern therein which provides necessary spin frequency and carrier frequency (if required) for the missile to be jammed. The reticles are arranged in series and modulate a source of radiation and generate the spin and carrier frequencies by blocking or rejecting radiation within the spectral passband of the missile to be jammed.

18 Claims, 6 Drawing Sheets

MULTIPLE INFRARED MISSILE JAMMER

BACKGROUND OF THE INVENTION

Heat seeking or infrared (IR) missiles have become a major threat against military vehicles and aircraft when employed by enemy forces as well as against civilian vehicles and aircraft by guerilla groups and other insurgents. Jamming waveform programs have been derived from a priori data on missile threat characteristics and from experiments to jam such IR missiles. However, one of the problems is that all of the known heat seeking missiles are not jammed by the same program. Presently available IR jammers consists of a source of infrared radiation and some means to modulate the radiation emitted by the source to produce a desired jamming signal. If multiple jamming programs are required to protect against multiple missile threats the planes or vehicles to be protected would generally have to have multiple jammers associated therewith. In addition to being expensive, multiple jammers can present a problem in that one missile could use a jammer for another missile as a beacon.

This problem has been somewhat alleviated by the system disclosed in U.S. patent application Ser. No. 373, 237 filed on Jun. 25, 1973 for "Multiple Spectral Band Opto-Mechanical Modulator" and assigned to assignee of the present application. This application discloses modulators for an infrared source to provide two distinct jamming programs from a single source, One modulator described in this patent application comprises a first rotating filter wheel having alternating radial segments of transparent and short wavepass filter material, a second rotating filter wheel having alternating radial segments of transparent and long wavepass filter material and a stationary wheel having alternating transparent and opaque radial segments positioned intermediate the first and second rotating wheels. This system provides simultaneous but independently radiation in two distinct spectral regions at different pulse repetition frequencies, if desired. This system is good in providing modulation of an IR source to countermeasure two missiles requiring different countermeasure programs. However, it is limited to two such programs.

SUMMARY OF THE INVENTION

Accordingly, it is an object of this invention to provide a new and novel modulator.

It is another object of this invention to provide a modulator which enables a single IR source to jam any number of different type missiles which are nearly mutually exclusive spectrally.

It is a further object of this invention to provide a modulator for generating different carrier and spin pulse repetition frequencies, pulse widths, pulse shapes, pulse repetition frequency sweep ranges and pulse repetition frequency sweep rates for different missile types simultaneously and with negligible interference.

It is yet another object of this invention to provide a system for simultaneously jamming a number of missiles.

Briefly, simultaneous jamming of a number of missile types which are nearly mutually exclusive spectrally are jammed with a single IR source by chopping or spatially modulating the output from the IR source with a series arrangement of spectral band-reject filters. Each missile to be jammed requires a distinct modulating reticle comprising alternating segments which alternately pass radiation at all wavelengths of interest and block or reject radiation at the wavelength of the missile to be jammed. For spin scan missiles these latter segments are further divided into segments which alternately pass all wavelengths of interest and block or reject radiation at the wavelengths of the missile to be jammed. This latter division of the segments provides carrier frequency. The band-reject segment may be either reflective or absorptive.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Disclosed herein are systems based upon a band-reject modulator concept in which spectrally selective, spatially modulating or chopping reticles (or similar devices) are used in series in an IR source beam to produce a set of spectrally mutually exclusive waveforms which can counter several missile types simultaneously.

The constraints on a universal jammer designed to simultaneously jam a multitude of missiles are, first, that the missiles must be spectrally mutually exclusive or nearly so since it is undesirable to permit a first missile to see the jammer transmission for a second missile for such transmission may cause the first missile to beacon on the jammer of the second missile while simultaneously being jammed by the jammer for the first missile. The net result would be uncertain and therefore to be avoided. If the missiles are not spectrally mutually exclusive, then the universal jammer should avoid any modulator transmission in the common portion of the two spectral regions in which the two missiles operate. If desired, IR source unmodulated energy in the overlapping spectral region may be blocked by a nonrotating band-reject filter reticle which does not transmit any radiation in the spectral overlap region but is transparent elsewhere in the spectral band of interest. This procedure insures that each missile will see spectrally only that jamming program which was designed to jam that missile and will not receive any other missile's jam program.

The second constraint is that in general the jam waveform requirement for each missile will differ and therefore the universal jammer must generate a multitude of waveforms, PRF's, pulsewidths, frequency sweep ranges and frequency sweep rates simultaneously. Lastly, all jamming programs must be generated by having the output of a single IR source contained in the system and each jammer-program-generating modulator must not attenuate or modulate the radiation used by the other modulators.

Such modulation should be done in series since parallel modulation schemes using wide-band beamsplitters necessarily produce a division of the total jammer radiant intensity in all spectral bands among jammer channels and thus reduce the radiant intensity of each component jammer. If narrow-band beamsplitters were used, power would not be wasted; however, such a system requires an optical system formidable in size, weight and cost.

Figure 1A:
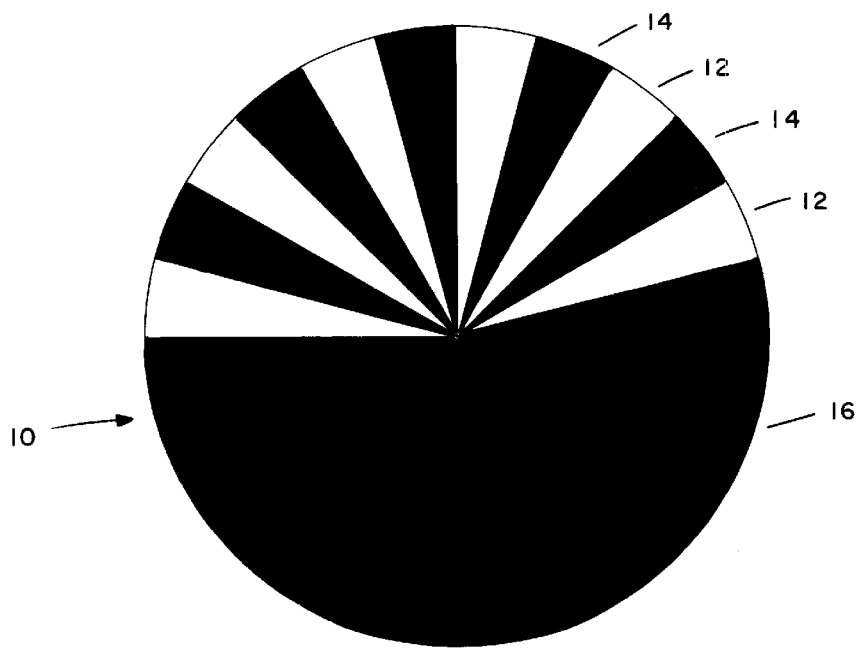
FIG. 1A is an illustration of a typical prior art chopping reticle.
Figure 1B:
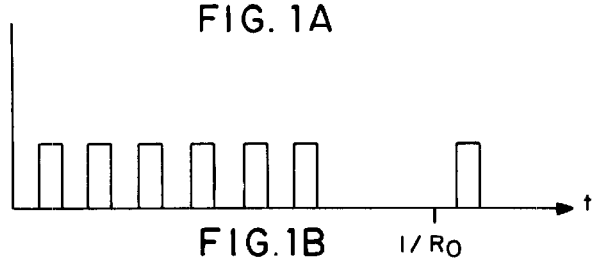
FIG. 1B is an illustration of the modulation obtained from the reticle of FIG. 1A.

A typical prior art modulating reticle is shown in FIG. 1A. This reticle is made up of radial segments 12 which transmit radiation in a bandwidth of interest and sections 14 and 16 which are opaque. When such a reticle is used to chop a radiant beam it will produce approximately the six pulse jamming temporal waveform shown in FIG. 1B where $R_o$=reticle rotation period. Putting more than one such reticle in series in different spectral bands can result in severe intermodulation or total elimination of the transmitted beam which destroys the effectiveness of each jamming program. Although the aforementioned patent application Ser. No. 373, 237 does disclose a modulator for two mutually exclusive jamming programs. The problem is therefore, how to place several such modulators in series all sharing the same source radiation but without causing any one such modulator to affect all the others.

Figure 2:
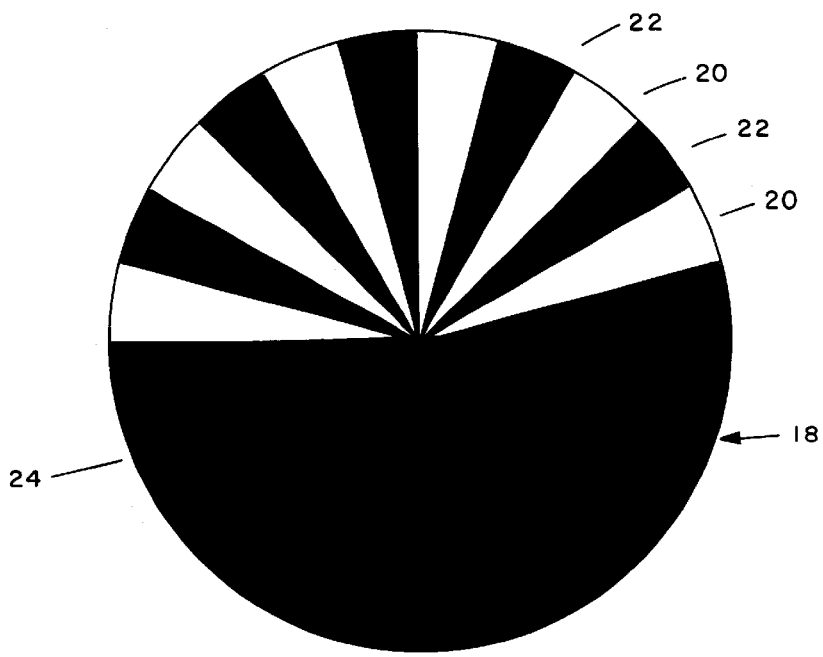
FIG. 2 is an illustration of one embodiment of a chopping reticle configured according to the invention.

The solution to this problem lies in first using a band-reject filter material (either reflective or absorptive) in place of the opaque material on the reticle and secondly, in replacing the bandpass filter material transmitting in the missile operational spectral band with a material which transmits over the entire operational spectral region of the jammer. Such a reticle is shown in FIG. 2. Reticle 18 comprises radial segments 20 which transmit radiation in the entire operational spectral region of the jammer and segments 22 and 24 which comprise band-reject material and are opaque only in one defined spectral band corresponding to the band of a particular missile to be jammed.

A jam program generator designed according to this invention will therefore consist of a series arrangement of these band-reject reticles constructed in the manner described above. The reticles may be on separate substrates and wheels or the entire jam program generator may be constructed on a single reticle substrate by layer-by-layer deposition of the proper filter materials in the desired patterns.

Each modulator reticle pattern may be periodic in the 360° of the wheel thereby producing a waveform with a fixed definable carrier pulse repetition frequency (PRF) and amplitude modulation PRF. Or for the spatially-modulated schemes described below with reference to FIGS. 3A and 3B the pattern may be nonuniform thereby producing swept jammer carrier and/or AM PRF in a "spread" electrical spectrum identical in shape to that produced by high-resolution "chirp" radar and sonar systems.

In addition, each reticle wheel may be driven from common or independent power sources by belts, friction drives, gears, etc. , and may be rotated at a constant rate or a swept rate by use of a nonuniform or time-va-rying drive mechanism. The effect of thus varying reticle rotational rate is identical to that discussed above with regard to the nonuniform reticle pattern.

Figure 3A:
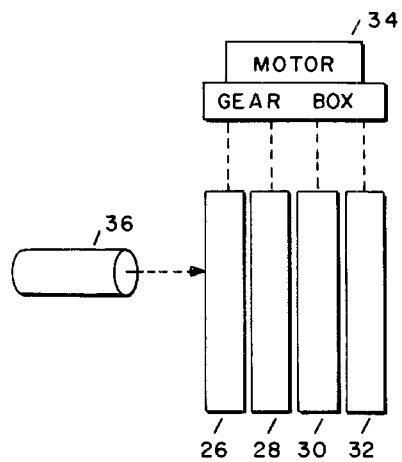
FIGS. 3A and 3B are illustrations of embodiments of a spatially modulated radiation system for providing multiple jamming programs.

FIG. 3A illustrates one embodiment of a multiple IR missile jammer comprising a plurality of reticle wheels 26, 28, 30 and 32, details of which will be described hereinafter. These reticle wheels are rotated by a motor 34. The reticles act as a spatial modulator for a focussed radiation source, that is, the reticles are positioned to intercept the beam of a radiation source 36 and they turn the radiation fully on or off in the selected spectral bands in a given solid angle of the radiation far field according to the reticle construction. This kind of system is particularly useful wherein the radiation source 36 produces a small beam. One typical radiation source is an arc lamp system since a focal point is generally available or simple to produce and the resulting small area to be modulated permits one to fabricate a reticle which is quite small. The IR spot size of a focussed source 36 on the reticle face may be several times larger than a single spoke width in this spatially modulated case. The reticle pattern within the spot size is then projected into space by the source's focussed beam.

Figure 3B:
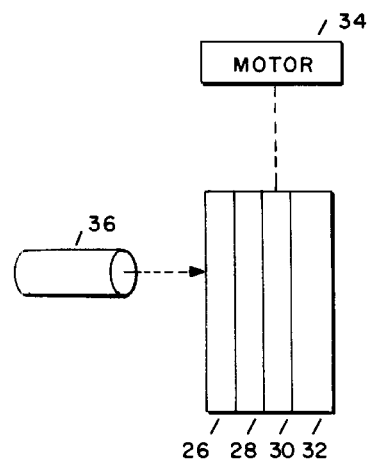

FIG. 3B illustrates an embodiment similar to FIG. 3A wherein spatial modulation is also provided. However, in this embodiment the reticles 26, 28, 30 and 32 are fixed to each other so as to rotate together. In FIG. 3A the spatial frequency is changed by changing rotational speed of any single reticle and/or reticle pattern. In FIG. 3B, the rotational speed of all reticles are the same and therefore to change the spatial frequency of IR radiation in a given spectral band the corresponding reticle must change its reticle pattern. If the IR spot size diameter of source 36 on the reticles is constrained to be equal to or smaller than the smallest reticle spoke width at the point of modulation, then source 36 may be nonfocussed or diffuse. In this case, the reticles act as temporal modulating choppers.

Figure 4A:
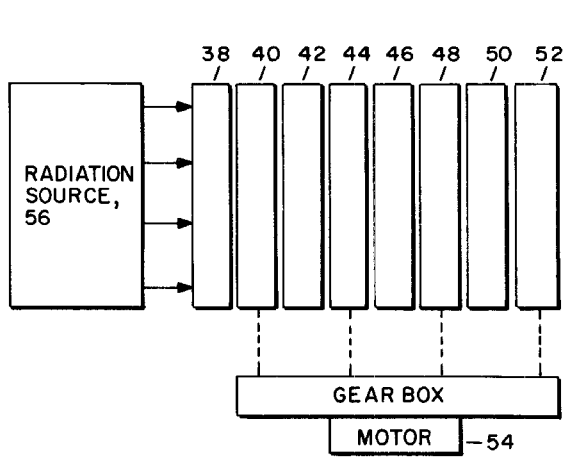
FIGS. 4A and 4B are illustrations of embodiments of a temporal modulation radiation system for providing multiple jamming programs.

FIG. 4A represents another system making use of the unique modulator system. This system comprises a plurality of reticles 38, 40, 42, 44, 46, 48, 50 and 52, four of which, 40, 44, 48, and 52, are driven by a motor 54. The eight reticles receive radiation from a source 56. In this type of system, which is a temporal modulator, the reticles must modulate a source 56 which has no focal point and which is the same size as the modulating reticles. Thus, none of the reticle pattern is projected in space but the output radiation is turned fully on or off in all space in each given spectral band and is therefore temporally modulated. Therefore, a missile at a considerable distance away will perceive the source temporally modulated simultaneously at all angles in the system's output field of view. Source 56 can be a small source, for example, an arc lamp system or a larger source, for example, a gas fired radiation source which may have no available focal point since the optics may be prohibitively large and costly. In this type of system reticles 38, 42, 46 and 50 are stationary and have patterns corresponding with their adjacent rotating reticles, that is, reticles 38 and 40 are identical as are 42, and 44, 46 and 48 and 50 and 52. Alternately, the stationary reticles can be rotated in a direction opposite of the rotating wheel thereby providing higher PRF's at lower rotational rates. Further, the "fixed" wheel can be dithered back and forth to provide FM. The combination of wheels are thus only set forth as suggested examples and changes thereto may be made depending upon the particular application.

Figure 4B:
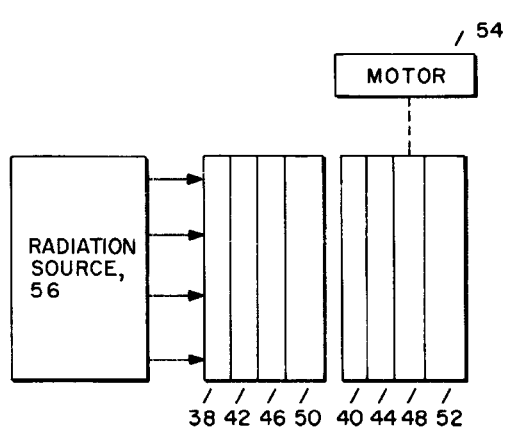

FIG. 4B represents an embodiment like FIG. 4 except that two banks of reticles are used. One bank is stationary and the other rotates together. Change in modulation frequency is thus accomplished in the manner of the embodiment of FIG. 3B.

Figure 5:
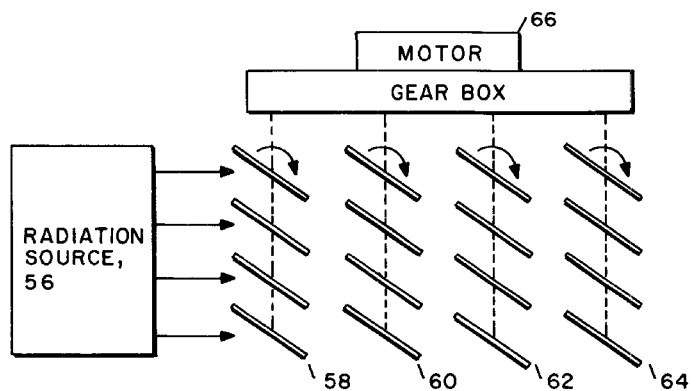
FIG. 5 is an illustration of a further embodiment of a temporal modulation radiation system for providing multiple jamming programs.

The technique is also applicable to other than reticle modulators. For example, FIG. 5 shows a series of rotating venetian blind modulators 58, 60, 62 and 64 driven by a motor 66. Each venetian blind modulator is fabricated from an appropriate band-reject material for operation in the desired missile band and the modulators are placed in series to receive radiation from source 56.

Reticle modulators are designed such that each reticle modulation plane (single modulator wheel) i must have:

(1) a clear portion to allow radiation to pass over the entire spectral region of interest $\Delta\lambda$ for all reticle planes. This clear portion's geometry on a given reticle plane produces the output radiation peaks and thereby determines the transmitted jamming waveform for that $i^{th}$ reticle.

(2) a band-reject filter portion which will block radiation in the $i^{th}$ reticle plane spectral region $\Delta\lambda_i$ but will pass all radiation in $\Delta\lambda$ which is not in $\Delta\lambda_i$. The $i^{th}$ band-reject filter geometry produces the output waveform radiation nulls in $\Delta\lambda_i$ while not affecting the transmitted waveform in the spectral regions of the other reticle planes. Therefore, if $T_i(\lambda)$ is the $i^{th}$ reticle plane transmission function:
  (i) $T_i(\lambda)=0$ for $\Delta$ in $\Delta\lambda_i$
  (ii) $T_i(\lambda)=1$ for $\lambda$ in $\Delta\lambda$ but not in $\Delta\lambda_i$
In addition, forcing
  (iii) $T_i(\lambda)=0$ for $\lambda$ not $\Delta\lambda$
will insure that the source will emit no radiation outside the jammer active spectral region and thereby not act as a target for a seeker operating in a spectral region outside of $\Delta\lambda$.

Successful operation of a multilayered reticle system requires that the spectral regions $\Delta\lambda_i$ (single missile operational spectral band) be nonoverlapping or nearly so. Assume $w_i(t)$ and $w_j(t)$ are the output radiation waveforms in $\Delta\lambda_i$ (first missile operational spectral band) and $\Delta\lambda_j$ (second missile operational spectral band), respectively, for nonoverlapping $\Delta\lambda_i$ and $\Delta\lambda_j$. Then in the case in which $\Delta\lambda_i$ and $\Delta\lambda_j$ are permitted to overlap, the output radiation waveforms will be $w_i(t)+\alpha_{ij}w_j(t)$ and $w_j(t)+\alpha_{ji}w_i(t)$ in $\Delta\lambda_i$ and $\Delta\lambda_j$, respectively, where:

$\alpha_{ij}$=fraction of output power in $\Delta\lambda_j$ which overlaps into $\Delta\lambda_i$ $\alpha_{ji}$=fraction of output power in $\Delta\lambda_i$ which overlaps into $\Delta\lambda_j$ and where
$0 \leq \alpha \leq 1$ Overlap of $\Delta\lambda_j$ into $\Delta\lambda_i$ is permissible only to the extent to which the interference signal in $\Delta\lambda_i$, $\alpha_{ij}w_j(t)$, can be tolerated without seriously disrupting the effectiveness of the $i^{th}$ jamming waveform $w_i(t)$.

The system-simplifying power of the band-reject multilayered-reticle jam waveform generator can be shown by an example using the following missiles: Sidewinder 1A, Redeye 60A, Sidewinder 1C, and the Falcon 4A. Table 1 below shows the pertinent characteristics of these four missiles.

TABLE I (S)

| Index i | Missile | $\Delta\lambda_i$ | $\Delta\lambda_{ij}$ | $F_{si}$ | $F_{ci}$ | $N_s$ | $\Delta F_{si}$ |
|---|---|---|---|---|---|---|---|
| 1 | Sw-1A | 1.8–2.7$\mu$ | — | 70 Hz | 840 Hz | 12 | −20 Hz |
| 2. | Redeye 60A | 2.7–3.2$\mu$ | 2.9–3.2 | 100 Hz | 1200 Hz | 12 | −10 Hz |
| 3 | SW-1C | 2.9–4.0$\mu$ | 3.8–4.0 | 125 Hz | 1500 Hz | 12 | 0 |
| 4 | Falcon 4A | 3.8–5.5$\mu$ | | 140 Hz | 1260 Hz | 9 | −20 Hz |

$F_{si}$ = spin rate nominal value
$F_{ci}$ = carrier rate nominal value
$N_s$ = number of carrier spoke pair cycles in missile reticle ($F_{ci}/F_{si}$)
$\Delta F_{si}$ = spin-down change in spin rate
$\Delta\lambda_i$ = $i^{th}$ missile operational spectral band
$\Delta\lambda_{ij}$ = spectral overlap region shared by missiles i and j It is possible to design a multilayered band-reject jammer reticle which should successfully jam all four of the above-mentioned missiles simultaneously when used with a single IR source of sufficient radiant intensity.

The choice of $n_i$, the number of jamming cycles of missile i waveform per reticle revolution, and the reticle rotational rate $R_0$ (revolutions/second) are dictated primarily by two considerations:

(i) The four pattern densities $n_i$ preferably are in the same ratios to one another as are the spin scan missile spin-rate frequencies $F_{si}$ (or the chosen jammer PRF's $F'_{si}$). Choosing a set of $n_1$, $n_2$, $n_3$, $n_4$ results in approximately fixing $R_0$ since it must be true that $F'_{si}n_i=R_0$ for all i. $R_0$ is therefore chosen as the average of the four $F_{si}/n_i$ in order to minimize the deviation of each jammer PRF in band i from the $i^{th}$ missile spin rate (or desired jammer PRF in band i). Conical scan jammer spin frequencies are typically slightly above or below the missile spin frequency.

(ii) The set of pattern densities ($n_1$, $n_2$, $n_3$, $n_4$) must be chosen appropriately low enough so that reticle and optics fabrication techniques are not too expensive, as would obviously occur with very high pattern density reticles. On the other hand, one would desire to choose the densities as high as practical since this generally results in minimizing the differences between generated jammer PRF's and actual missile spin rates or desired jammer PRF's. Such errors resulting from a practical choice of reticle pattern densities and R may be overcome by broadening the electrical spectrum of the $i^{th}$ jammer output waveform through reticle pattern density sweep, reticle rotational rate sweep, or both.

Table 2 shows a table of $F'_{si}n_i$ for the four missiles under consideration.

TABLE II (C)

| $n_i$ | $F'_{s1}/n_i$ | $F'_{s2}/n_i$ | $F'_{s3}/n_i$ | $F'_{s4}/n_i$ |
|---|---|---|---|---|
| 1 | 70 | 90 | 125 | 140 |
| 2 | 35 | 45 | 62.5 | 70 |
| 3 | (23.3) | 30 | 42 | 46.7 |
| 4 | 17.5 | (22.5) | 31.3 | 35 |
| 5 | 14 | 18 | (25.0) | 28 |
| 6 | (11.7) | 15 | 20.8 | (23.3) |
| 7 | 10 | 12.85 | 17.9 | 20.0 |
| 8 | 8.75 | (11.25) | 15.6 | 17.5 |
| 9 | 7.77 | 10 | 13.9 | 15.5 |
| 10 | (7.00) | 9 | 12.5 | 14 |
| 11 | 6.36 | 8.17 | (11.4) | 12.7 |
| 12 | 5.85 | 7.50 | 10.4 | (11.65) |
| 13 | | (6.92) | 9.60 | 10.75 |
| 14 | | 6.43 | 8.93 | 10.0 |
| 15 | | | 8.33 | 9.33 |
| 16 | | | 7.81 | 8.75 |
| 17 | | | 7.35 | 8.24 |
| 18 | | | (6.95) | 7.78 |
| 19 | | | | 7.37 |
| 20 | | | | (7.00) |

Note:
$F'_{s2} \neq F_{s2}$ for the Redeye 60A missile because it is a conical scan missile (see remarks above re conical scan missiles).

To design a modulator with all four band-reject materials on the same reticle substrate, one must force $R_o \approx F'_{si}/n_i$ for all four reticle planes. Three solution sets for $(n_1, n_2, n_3, n_4)$ are shown in Table 2; others can easily be chosen. The circled numbers are the four $R_o$'s required for exact generation of each $F_{si}$. Table 3 displays the resulting jammer PRF's for these three solution sets as well as the reticle rotation rate which was chosen for each set as the average of the four $F'_{si}/n_i$ for the given solution set.

TABLE III (C)

| | | Jammer PRF in $\Delta\lambda_i$ in Hertz | | | |
|---|---|---|---|---|---|
| $(n_i)$ | $R_o$ | $n_1R_o$ | $n_2R_o$ | $n_3R_o$ | $n_4R_o$ |
| (3, 4, 5, 6) | 23.3 Hz | 70 | 93 | 117 | 140 |
| (6, 8, 11, 12) | 11.5 Hz | 69 | 92 | 126.5 | 138 |
| (10, 13, 18, 20) | 6.97 Hz | 69.7 | 90.6 | 125.4 | 139.3 |
| IDEAL CASE | — | 70 | 90 | 125 | 140 |

Figure 6:
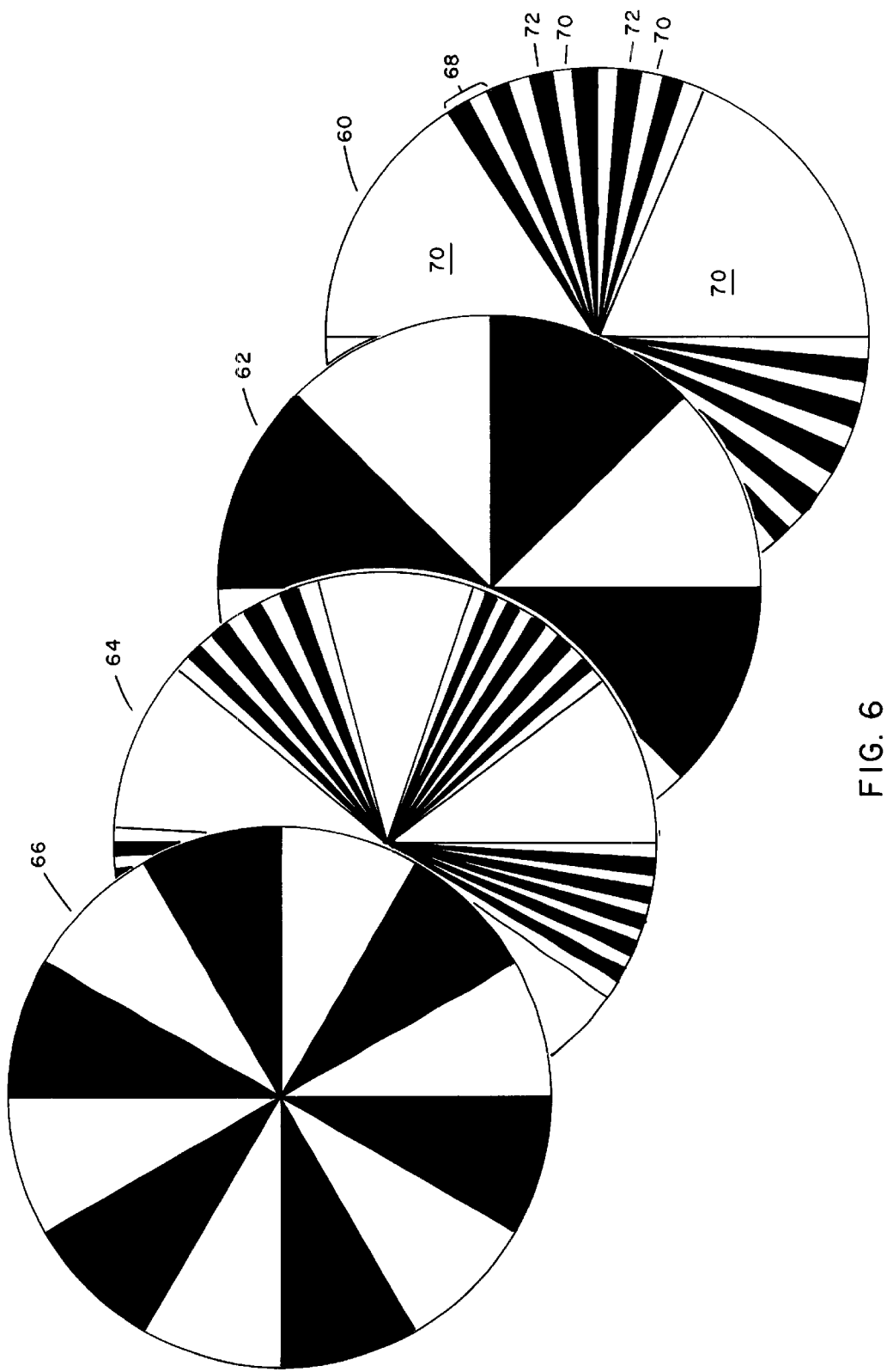
FIG. 6 is an illustration of one embodiment of typical reticles which may be employed in the systems of FIGS. 3 and 4.

In FIG. 6 four reticles 60, 62, 64 and 66 are illustrated for use in the embodiment of FIG. 3B. These reticles are driven at the same speed and each has a different pattern thereon to produce four different sets of spatial frequencies. Reticle 60 is used to jam the Sidewinder 1A missile; reticle 62 is used to jam the Redeye 60A missile; reticle 64 is used to jam the Side-winder 1C missile; and reticle 66 is used to jam the Falcon 4A missile. Other missiles can be jammed by formulating other reticles in accordance with the principles set forth hereinbefore.

These reticles were formulated in accordance with the first solution from Table 2. Of course, we could fashion the reticle pattern like the first line of Table 2 where $n_i=1$ for each reticle. However, then each reticle would have to be separately driven at its spin frequency as in the embodiment of FIG. 3A.

Since it is preferred to drive the reticle package at the same frequency (together) the user, by looking in Table 2, selects a $F'_{si}/_{ni}$ for each reticle which are as close as possible. In this example $F'_{si}/_{ni}$ of 23.3, 22.5, 25.0 and 23.3 was chosen, however ,another set of four circled numbers could have been selected. $n_i$ is the number of spin cycles/reticle and thus, in accordance with Table 2, reticle 60 has 3 spin cycles, reticle 2 has 4, reticle 64 has 5 and reticle 66 has 6.

In addition, for spin scan missiles such as Sidewinder-1A and Side-winder 1C a carrier must also be generated by the reticle. For example, in Table 1 it is shown that the carrier frequency is $\frac{1}{12}$ of the spin frequency (840/70) for the Sidewinder 1A. Therefore reticle 60 also has spokes placed at a rate of 12 for each spin cycle. Only half of these are shown since the other half are blocked by the segments 70 which transmit radiation in the entire operational spectral region of the jammer.

Note: reticle 60 is made up of portions 70 which transmit over the entire spectral region of the jammer and segments 72 which are opaque in the missile spectral band in the manner set forth hereinbefore in the description of FIG. 2. The other reticles 62, 64 and 66 are constructed in like fashion.

Figure 7:
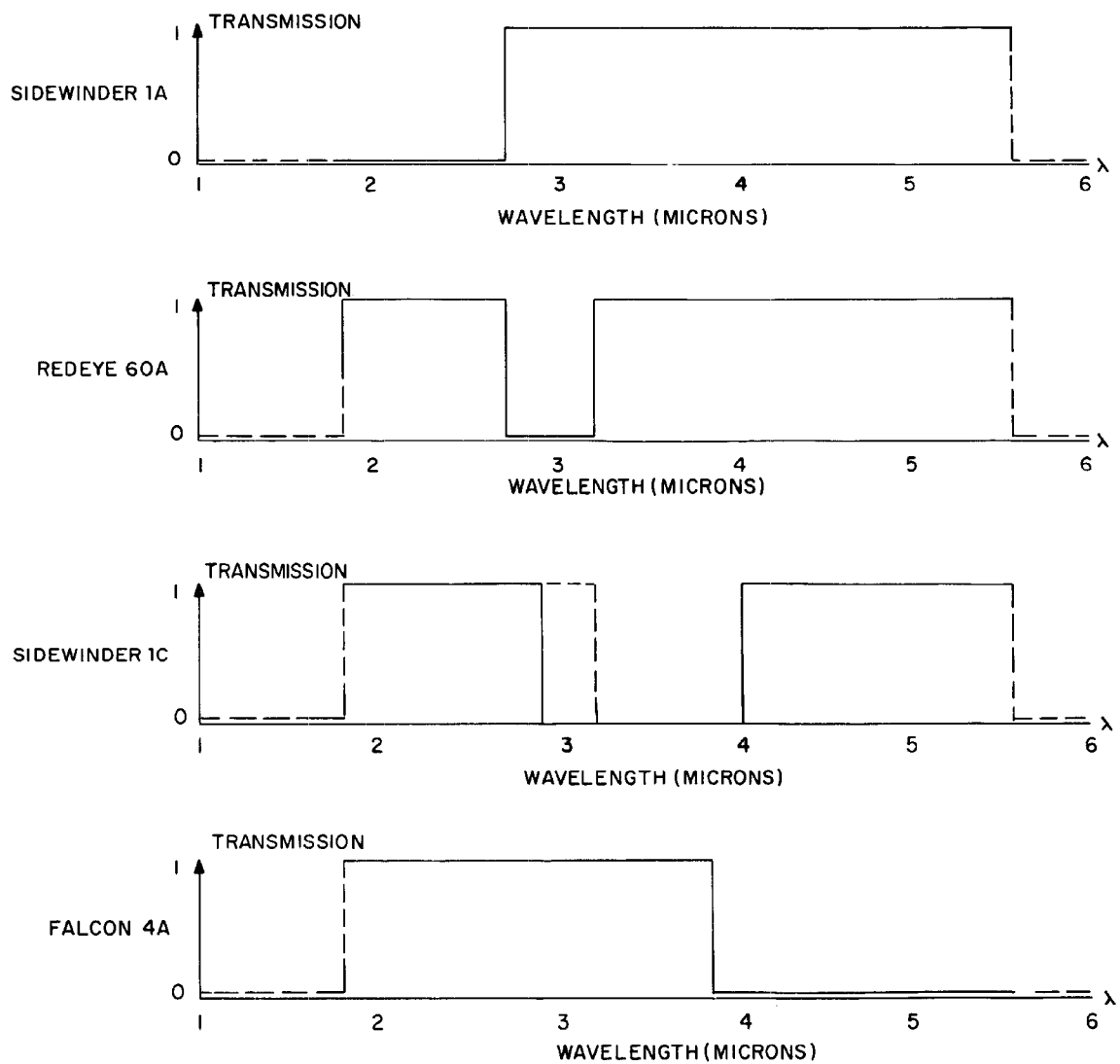
FIG. 7 are graphical illustrations of the spectral transmission characteristics of the reticles of FIG. 6.

FIG. 7 illustrates the band-reject transmission functions for each of the reticles of FIG. 6 ($\lambda$ is given in microns). The transmission function for each material is specified but the reflection and absorption functions are not Obviously, even though the unwanted radiant power in $\Delta\lambda_i$ could be excluded by either reflection or absorption in the material, it is desired to have it reflected as much as possible since an absorptive band-reject material would require much cooling in a high-power jammer having high irradiance on the reticle.

Figure 8:
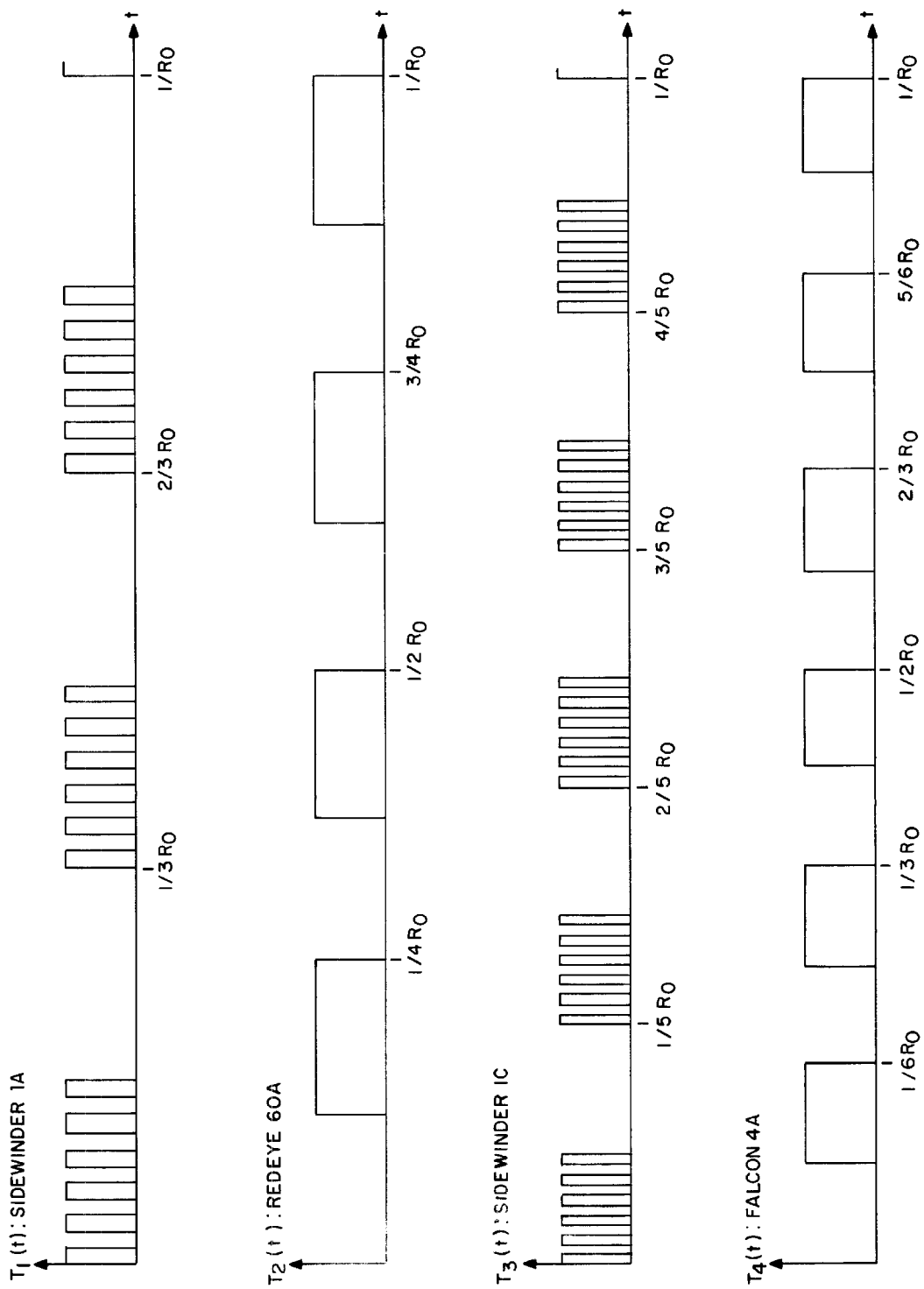
FIG. 8 illustrates waveforms of the radiation pattern obtained from the reticles of FIG. 6.

The modulated outputs of reticles 60–66 shown in FIG. 8.

Overall covert operation of the jammer outside of the jammer operational band $\Delta\lambda$ can be simply achieved by the use of a bandpass spectral filter with transmission of 1 in $\Delta\lambda$ and 0 outside of $\Delta\lambda$.

Figure 9:
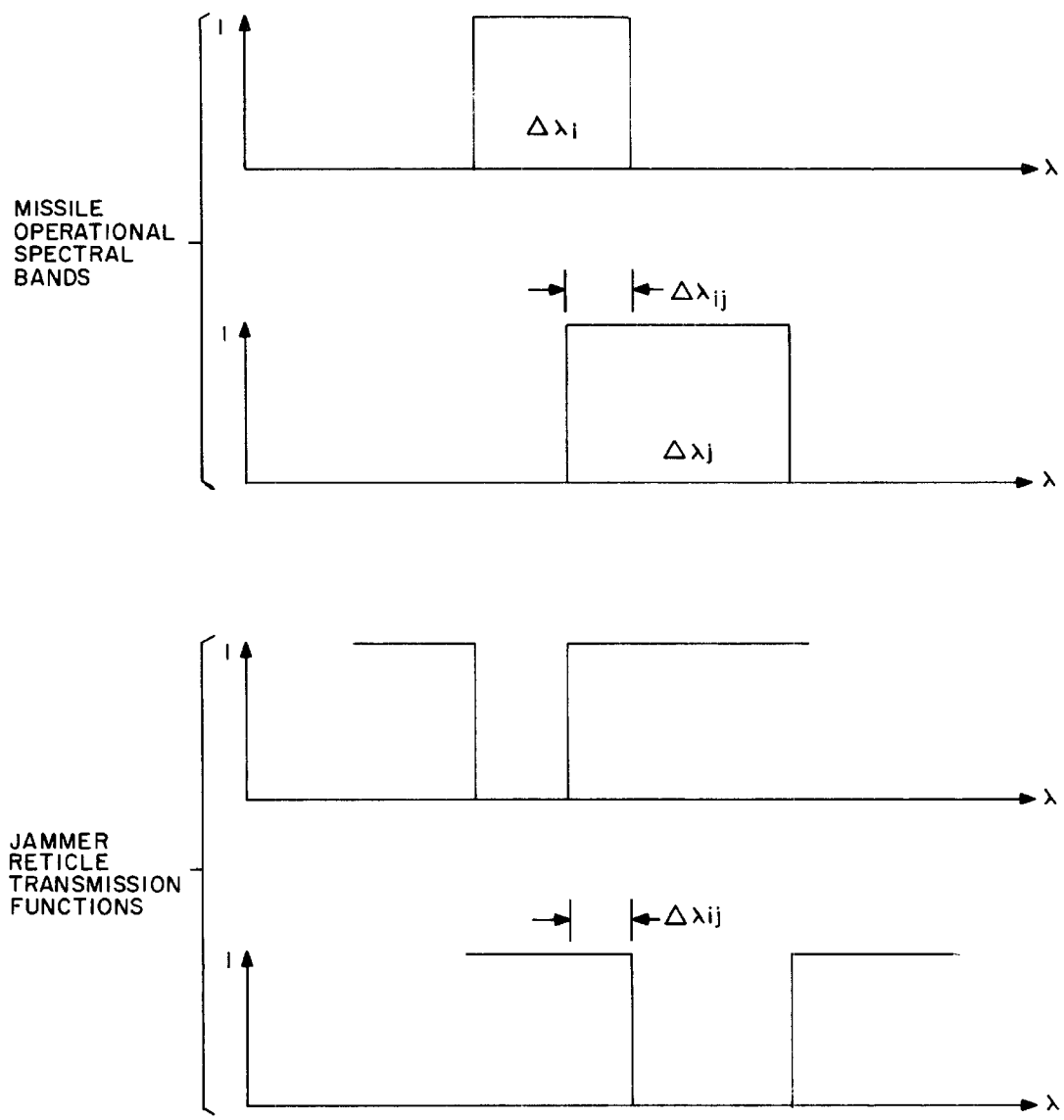
FIG. 9 are graphical illustrations showing a comparison of the spectral bands of typical missiles versus the transmission function of reticles used to jam the same missiles.

Obviously, the spectral bands of the Redeye 60A and the Sidewinder 1C overlap. One may reduce the $\Delta\lambda_i$ and $\Delta\lambda_j$ overlapping interference signals to zero by choosing the band reject filters such that they pass all radiation in the spectral overlap zone $\Delta\lambda_{ij}$ as shown in FIG. 9.

This elimination of all modulation is done at the expense of lost jamming power in both missile spectral bands $\Delta\lambda_i$ and $\Delta\lambda_j$. The loss is seen to be severe in the case of the Redeye 60A which would have its jammer band reduced from 2.7–3.2 to 2.7–2.9 microns. This problem may be mitigated somewhat by permitting the Redeye 60A jammer to use the full $\Delta\lambda_i$ of 2.7–3.2, while restricting the Sidewinder 1C band to 3.2 to 4.0 microns as indicated by the dotted line in FIG. 9's $T_3$ function. Thus, full jammer power is available for the Redeye 60A in its band although a small jammer interference signal is now present in the Sidewinder 1C $\Delta\lambda_j$ band as a result. This interference signal may be insignificant since the total Sidewinder 1C spectral band is much larger than the overlap interference band.

Also, the Sidewinder 1C and Falcon 4A spectral bands overlap in 3.8–4.04. However, the breadth of both missile operational spectral bands is so large in comparison to the overlap band that it will probably be possible to split the band between the missiles in the assignment of radiated power without suffering any serious level of interference to either missile.

Thus, the example above indicates that it is possible to construct a multi-missile jammer reticle which will be effective even if the missile spectral bands do have some small amount of spectral overlap.

Benefits such as having no spectral-overlap interference signals must be traded off against the resultant costs so that the necessary jam-to-(signal plus interference) ratio is achieved in each spectral band. This trade-off must be made in order to determine if the full spectral overlap interference signals are preferable to the loss of jammer power resulting from having no spectral-overlap interference signals at all or if there is an optimal compromise for each given jammer-aircraft-missile pair combination in such a conflict of requirements.

Of considerable interest is the problem of producing a broadband (i. e. swept frequency) jammer to counter a missile such as the Sidewinder 1A which has a spin rate which decreases with time.

Missiles which have reticle frequency spin-down require a frequency swept jammer program which will generate electrical spectral lines in (i. e., sweep through) the missile's sensitive electrical spectral region. This "chirp spectrum" generation may be achieved by sweeping the periodic-patterned reticle rotational rate, by "sweeping" the jamming reticle pattern density on the reticle (i. e., by making the pattern spatially nonuniform around the reticle) while holding the reticle rotational rate constant, or by using a combination of these two techniques.

In the swept rotational rate case, one may sweep the speed at R Hz/sec over a band $\Delta F$ of rotational speeds. If the deposited reticle pattern has n identical subpatterns in the 360° of the reticle, then the jammer envelope PRF will be swept at a rate of nR Hz/sec over a range n $\Delta F$ Hz. Of course, if the average rotational frequency is $R_0$ Hz, then the average jammer PRF will be $nR_0$. The presence of the factor of n (which may be at least as great as 10 or as small as 1) in the jammer average PRF, PRF band, and PRF sweep rate implies that the reticle sweep rate R and deviation $\Delta F$ may be quite low and therefore easy to achieve with available components.

In the nonuniform "swept pattern density" cases of FIGS. 3A and 3B, jammer electrical spectral lines are generated at frequencies which are multiples of $R_0$. If the pattern spin rate envelope densities (cycles per $2\pi$ radians of the reticle) varies from $n_1$ to $n_2$, then the jammer spin PRF sweep range will vary from $n_1 R_0$ to $n_2 R_0$ Hz, while the sweep rate will be $(n_1-n_2) R_0^2$ Hz/sec.

It may well be ideal to use both techniques simultaneously, using a small rotational speed variation and a periodic uniform reticle pattern for constant-spin-rate missiles having only a narrow spin rate band (such as the Sidewinder 1C) and a nonuniform "swept pattern density" reticle to produce the wider electrical spectral spread necessary to cover spin-down missiles (such as the Sidewinder 1A) having a wide jamming-sensitive spin rate band.

However, if $\Delta F$ and $F_{ci}$ are incompatible with a single-reticle jammer with or without motor and pattern sweep, then the patterns may be separated into groups, in which each group has compatible $F_{ci}$ and $\Delta F_i$ for inclusion in a single reticle wheel. This single-motor, multiple-wheel jammer may then have a common constant-speed motor to drive all wheels, e. g. , through belts. A constant-speed reticle could then be driven by a circular pulley whereas a swept-speed reticle could be driven by an eccentric pulley.

It may be, in many cases, more economical or advantageous for other reasons to use several wheels separately driven to produce the spectrally composite jammer waveforms. The mechanical problems involved in driving several wheels from a common motor using belts, different drive ratios, and eccentric drive pulleys to produce variable reticle rotational rates may be far simpler than the: problems involved in the process of constructing the multilayer-deposition single-reticle system with its simplest drive system even though the latter is more conceptually elegant.

Different jamming pulse widths may be achieved simply by modifying the reticle spoke widths. Also, the pulse shapes may also be modified by a gradation in the thickness of the band-reject material (or by using a fine grating or dot-density construction as do photographic printers) to achieve transmission function values other than 1 or 0.

While I have described above the principles of my invention in accordance with specific apparatus, it is to be clearly understood that this description is made only by way of example and not as a limitation of the scope of my invention as set forth in the accompanying claims.

I claim:

1. Apparatus for modulating a source of radiant energy to provide at least three distinct signals of substantially different spectral bands $\Delta\lambda_i$, $\Delta\lambda_j$ and $\Delta\lambda_k$, comprising:

a first reticle having first and second segments of different spectral transmission characteristics, said first segments of said first reticle providing transmission of source radiant energy at all of said different spectral bands and said second segments of said first reticle rejecting transmission at a first predetermined band $\Delta\lambda_i$ and transparent at all other of said different spectral bands, a second reticle in series with said first reticle having at least first and second segments of different spectral transmission characteristics, said first segments of said second reticle providing transmission of source radiant energy at all of said different spectral bands and said second segments of said second reticle rejecting transmission at a second predetermined band $\Delta\lambda_j$ and transparent at all other of said different spectral bands, and a third reticle in series with said first and second reticles having at least first and second segments of different spectral transmission characteristics, said first segments of said third reticle providing transmission of source radiant energy at all of said different spectral bands and said second segments of said third reticle rejecting transmission at a third predetermined band $\Delta\lambda_k$ and transparent at all other of said different spectral bands.

2. Apparatus as defined in claim 1, further including first means for providing rotation to said first reticle, second means for providing rotation to said second reticle and third means for providing rotation to said third reticle.

3. Apparatus as defined in claim 1, further including means for providing simultaneous rotation to said first, second and third reticles.

4. Apparatus as defined in claim 3 wherein said first, second and third reticles comprise a single unitary structure.

5. Apparatus as defined in claim 4 wherein said first, second and third reticles form successive depositions on a transparent substrate.

6. Apparatus as defined in claim 1 further including means for filtering the radiant energy from the modulating apparatus in a predetermined band.

7. Apparatus as defined in claim 1, further including fourth, fifth and sixth reticles substantially identical to said first, second and third reticles, respectively.

8. Apparatus as defined in claim 7, further including means for providing relative rotation between said first and fourth reticles, between said second and fifth and between said third and sixth reticles.

9. Apparatus as defined in claim 7, further including means for providing simultaneous rotation to said first, second, and third reticles.

10. Apparatus as defined in claim 9, wherein said first, second and third reticles and said fourth, fifth and sixth reticles comprise a pair of unitary structures.

11. Apparatus as defined in claim 7, further including means for filtering the radiant energy from the modulating apparatus in a predetermined band.

12. Apparatus for modulating a source of radiant energy to provide at least three distinct signals of substantially different spectral bands, $\Delta\lambda_i$, $\Delta\lambda_j$ and $\Delta\lambda_k$, comprising:

a first venetian blind modulator having slats transparent at $\Delta\lambda_j$ and $\Delta\lambda_k$ while rejecting transmission at $\Delta\lambda_i$, a second venetian blind modulator having slats transparent at $\Delta\lambda_i$ and $\Delta\lambda_k$ while rejecting transmission at $\Delta\lambda_j$, a third venetian blind modulator having slats transparent at $\Delta\lambda_i$ and $\Delta\lambda_j$ while rejecting transmission at $\Delta\lambda_k$ said first, second and third venetian blind modulators being arranged in series; and means for providing rotation of said modulators.

13. Apparatus for simultaneously jamming multiple missiles having radiation responsive guidance systems which operate at substantially different spectral bands of energy, comprising:

a radiant source providing energy at the operating spectral bands of the missiles;

a first modulating element having first and second segments of different spectral transmission characteristics, said first segments being substantially transparent to all of said different spectral bands and said second segments being opaque at the operating spectral band of one missile and transparent at all other of said different spectral bands;

a second modulating element in series with said first modulating element having first and second segments of different spectral transmission characteristics, said first segments being substantially transparent to all of said different spectral bands and said second segments being opaque at the operating spectral band of a second missile and transparent at all other of said different spectral bands;

a third modulating element in series with said first and second modulating elements having first and second segments of different spectral transmission characteristics, said first segments being substantially transparent to all of said different spectral bands and said second segments being opaque at the operating spectral band of a third missile and transparent at all other of said different spectral bands, and means for providing rotation to said first, second and third modulating elements.

14. Apparatus as defined in claim 13 wherein said radiant source produces a beam substantially smaller than any of said modulating elements.

15. Apparatus as defined in claim 13 wherein said radiant source is substantially the same size as said modulating elements and further comprising fourth, fifth and sixth modulating elements substantially identical to said first, second and third modulating elements and means for providing relative rotation between said first and fourth modulating elements, said second and fifth modulating elements and said third and sixth modulating elements.

16. Apparatus for jamming multiple missiles having radiation responsive guidance systems which operate at substantially different spectral bands of energy, comprising:

a radiant source providing energy at the operating spectral bands of the missiles;

a first venetian blind modulator having slats transparent at the operating spectral band of second and third missiles while rejecting transmission at the operating spectral band of a first missile;

a second venetian blind modulator having slats transparent at the operating spectral band of first and third missiles while rejecting transmission at the operating spectral band of a second missile;

a third venetian blind modulator having slats transparent at the operating spectral band of first and second missiles while rejecting transmission at the operating spectral band of a third missile;

said first, second and third venetian blind modulator being arranged in series; and means for providing rotation to said modulators.

17. Apparatus for modulating a source of radiant energy to provide first and second signals at a first spectral band $\Delta\lambda_i$ and a third signal at a second spectral band $\Delta\lambda_j$, comprising:

a first reticle having first and second segments of different spectral transmission characteristics, said first segments of said first reticle providing transmission of source radiant energy at a band encompassing $\Delta\lambda_i$ and $\Delta\lambda_j$ said second segments of said first reticle rejecting transmission at a first predetermined band $\Delta\lambda_j$ and transparent at a band encompassing $\Delta\lambda_i$; and a second reticle in series with said first reticle having first and second major segments, said first major segments providing transmission of source radiant energy over a band encompassing $\Delta\lambda_i$ and $\Delta\lambda_j$ and said second major segments divided into third and fourth subsegments with said third subsegments providing transmission of radiant energy over a band encompassing $\Delta\lambda_i$ and $\Delta\lambda_j$ and said fourth subsegments being opaque at $\Delta\lambda_i$ and transparent over a band encompassing $\Delta\lambda_j$.

18. Apparatus for simultaneously jamming N missiles having radiation responsive guidance systems which operate at N substantially different spectral bands of energy, where N is equal to or greater than 3, comprising:

a radiant source providing energy at the N operating spectral bands of the missiles;

N modulating elements disposed to receive energy from said radiant source, each of which is adapted to alternately transmit radiation at said N different spectral bands during one predetermined time period and reject transmission of radiation at a different one of said N different spectral bands while transmitting radiation of all other of said N spectral bands during another predetermined time period; and means for driving said modulating elements.

* * * * *